(12) United States Patent
Adkisson

(10) Patent No.: US 7,475,301 B2
(45) Date of Patent: Jan. 6, 2009

(54) INCREMENT/DECREMENT CIRCUIT FOR PERFORMANCE COUNTER

(75) Inventor: Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1065 days.

(21) Appl. No.: 10/635,369

(22) Filed: Aug. 6, 2003

(65) Prior Publication Data

US 2004/0237003 A1    Nov. 25, 2004

Related U.S. Application Data

(60) Provisional application No. 60/469,180, filed on May 9, 2003.

(51) Int. Cl.
    *G01R 31/28*     (2006.01)
    *H03L 7/00*     (2006.01)
    *G06F 11/00*     (2006.01)

(52) U.S. Cl. .................. 714/724; 714/706; 327/151; 327/153

(58) Field of Classification Search .............. 714/724, 714/706; 327/151, 153
See application file for complete search history.

(56) References Cited

U.S. PATENT DOCUMENTS

| | | | |
|---|---|---|---|
| 5,651,112 A | 7/1997 | Matsuno et al. | |
| 5,796,633 A | 8/1998 | Burgess et al. | |
| 5,835,702 A | 11/1998 | Levine et al. | |
| 5,881,223 A | 3/1999 | Agrawal et al. | |
| 5,913,229 A * | 6/1999 | Joo | 711/200 |
| 6,112,317 A | 8/2000 | Berc et al. | |
| 6,112,318 A | 8/2000 | Jouppi et al. | |
| 6,275,782 B1 * | 8/2001 | Mann | 702/182 |
| 6,360,337 B1 | 3/2002 | Zak et al. | |
| 6,546,359 B1 | 4/2003 | Week | |
| 6,826,247 B1 * | 11/2004 | Elliott et al. | 375/376 |
| 2001/0005408 A1 * | 6/2001 | Neukom | 375/376 |

* cited by examiner

*Primary Examiner*—Jacques H Louis-Jacques
*Assistant Examiner*—John J Tabone, Jr.

(57) ABSTRACT

An increment/decrement circuit for use with a general purpose performance counter ("GPPC") connected to a bus carrying debug data. In one embodiment, the increment/decrement circuit includes a delay circuit block operable to receive and align the debug data. First and second mask circuits are connected in parallel to the delay circuit block in order to select and assert portions of the aligned debug data for incrementing and decrementing, respectively. An accumulation circuit is connected to the first mask circuit and the second mask circuit for generating an accumulated value based on the outputs of the mask circuits.

14 Claims, 6 Drawing Sheets

INCREMENT/DECREMENT CIRCUIT FOR PERFORMANCE COUNTER

PRIORITY UNDER 35 U.S.C. §119(e) & 37 C.F.R. §1.78

This nonprovisional application claims priority based upon the following prior United States provisional patent application entitled: "General Purpose Counters for Performance, Debug and Coverage," Application No. 60/469,180, filed May 9, 2003, in the name(s) of Richard W. Adkisson and Tyler J. Johnson, which is hereby incorporated by reference.

CROSS-REFERENCE TO RELATED APPLICATIONS

This application is related to U.S. patent application Ser. No. 10/635,083, filed Aug. 6, 2003, entitled GENERAL PURPOSE PERFORMANCE COUNTER now U.S. Pat. No. 7,424,397; U.S. patent application Ser. No. 10/635,371, filed Aug. 6, 2003, entitled COVERAGE CIRCUIT FOR PERFORMANCE COUNTER now U.S. Pat. No. 7,415,643; U.S. patent application Ser. No. 10/635,372, filed Aug. 6, 2003, entitled COVERAGE DECODER CIRCUIT FOR PERFORMANCE COUNTER now U.S. Pat. No. 7,275,191; U.S. patent application Ser. No. 10/635,103, filed Aug. 6, 2003, entitled DATA SELECTION CIRCUIT FOR PERFORMANCE COUNTER now U.S. Pat. No. 7,404,112; U.S. patent application Ser. No. 10/635,079, filed Aug. 6, 2003, entitled ZEROING CIRCUIT FOR PERFORMANCE COUNTER now U.S. Pat No. 7,430,696; and U.S. patent application Ser. No. 10/635,373, filed Aug. 6, 2003, entitled MATCH CIRCUIT FOR PERFORMANCE COUNTER now U.S. Pat No. 7,331,003; all of which are hereby incorporated by reference in their entirety.

Related subject matter disclosed in the following commonly owned U.S. patent applications: (i) A BUS INTERFACE MODULE, filed Mar. 28, 2003; application Ser. No. 10/402,092 now U.S. Pat No 7,146,538; and (ii) AN INTEGRATED CIRCUIT, filed Mar. 28, 2003; application Ser. No. 10/402,034 now U.S. Pat No. 7,188,277, is hereby incorporated by reference.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. These applications are not supported by the state-of-the-art performance counters.

SUMMARY

An increment/decrement circuit is disclosed that may be used with a general purpose performance counter ("GPPC") connected to a bus carrying debug data. In one embodiment, the increment/decrement circuit includes a delay circuit block operable to receive and align the debug data. First and second mask circuits are connected in parallel to the delay circuit block in order to select and assert portions of the aligned debug data for incrementing and decrementing, respectively. An accumulation circuit is connected to the first mask circuit and the second mask circuit for generating an accumulated value based on the outputs of the mask circuits.

DETAILED DESCRIPTION OF THE DRAWINGS

Figure 1:
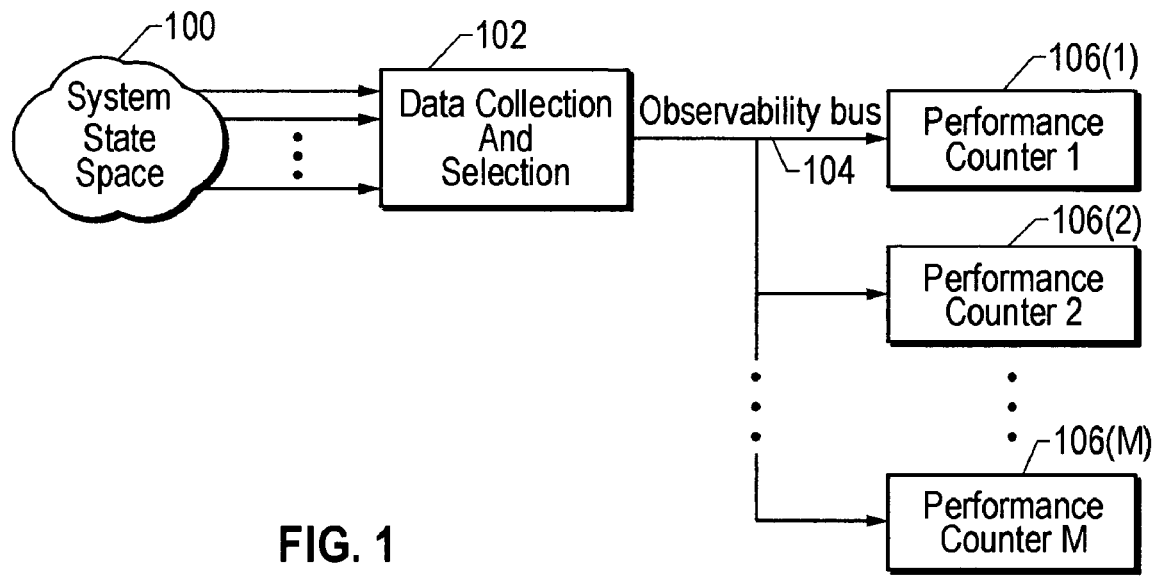
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability bus 104, carrying a D-bit debug_ bus signal to a plurality of performance counters 106(1)-106 (M). Details of one embodiment of the logic 102 and bus 104 are provided in U.S. patent application Ser. No. 10/402,092; filed Mar. 28, 2003, entitled A BUS INTERFACE MODULE; and U.S. patent application Ser. No. 10/402,034; filed Mar. 28, 2003, entitled AN INTEGRATED CIRCUIT, each of which is hereby incorporated by reference in its entirety.

In one embodiment, D is equal to 80, M is equal to 12, and performance counters 106(1)-106(M−1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
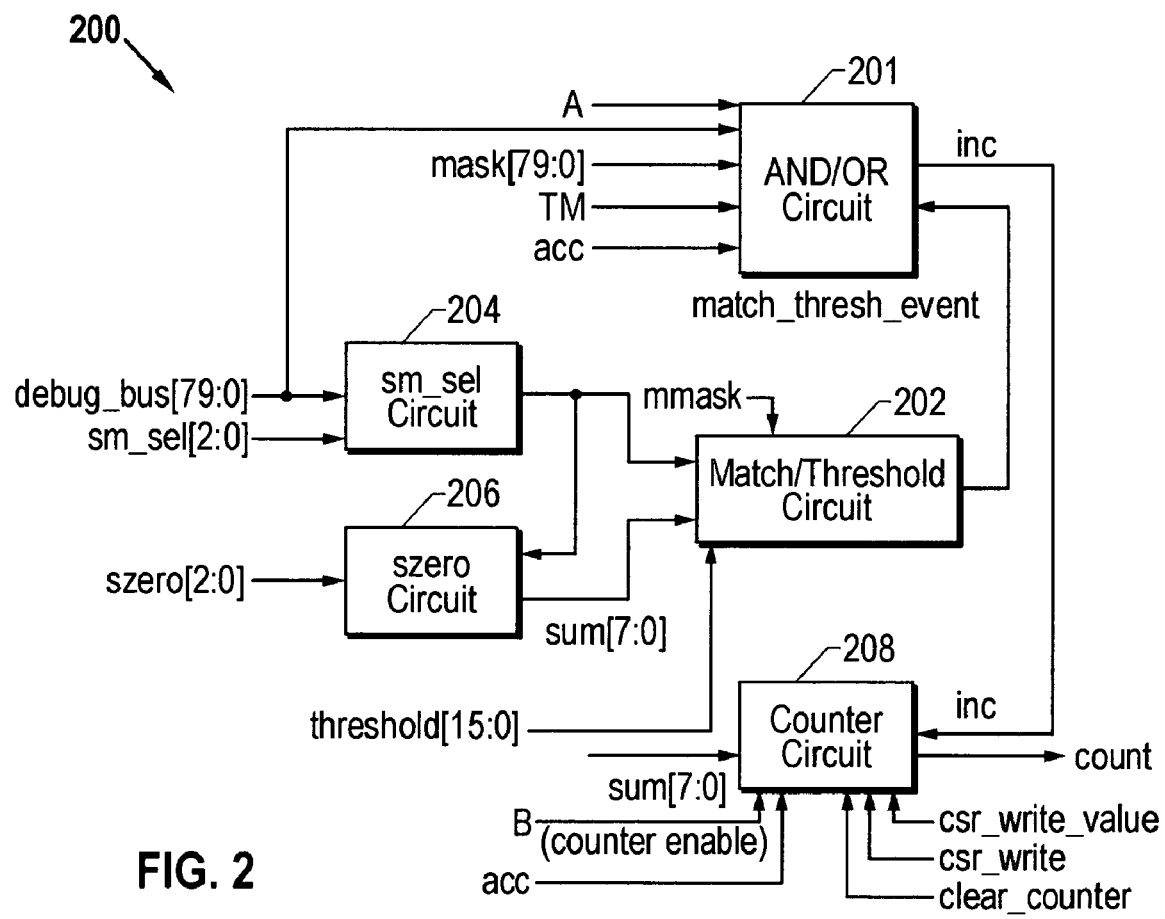
FIG. 2 is a block diagram of a general purpose performance counter ("GPPC") according to one embodiment.

FIG. 2 is a block diagram of a general purpose performance counter 200, which is identical in all respects to each of the performance counters 106(1)-106(M−1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
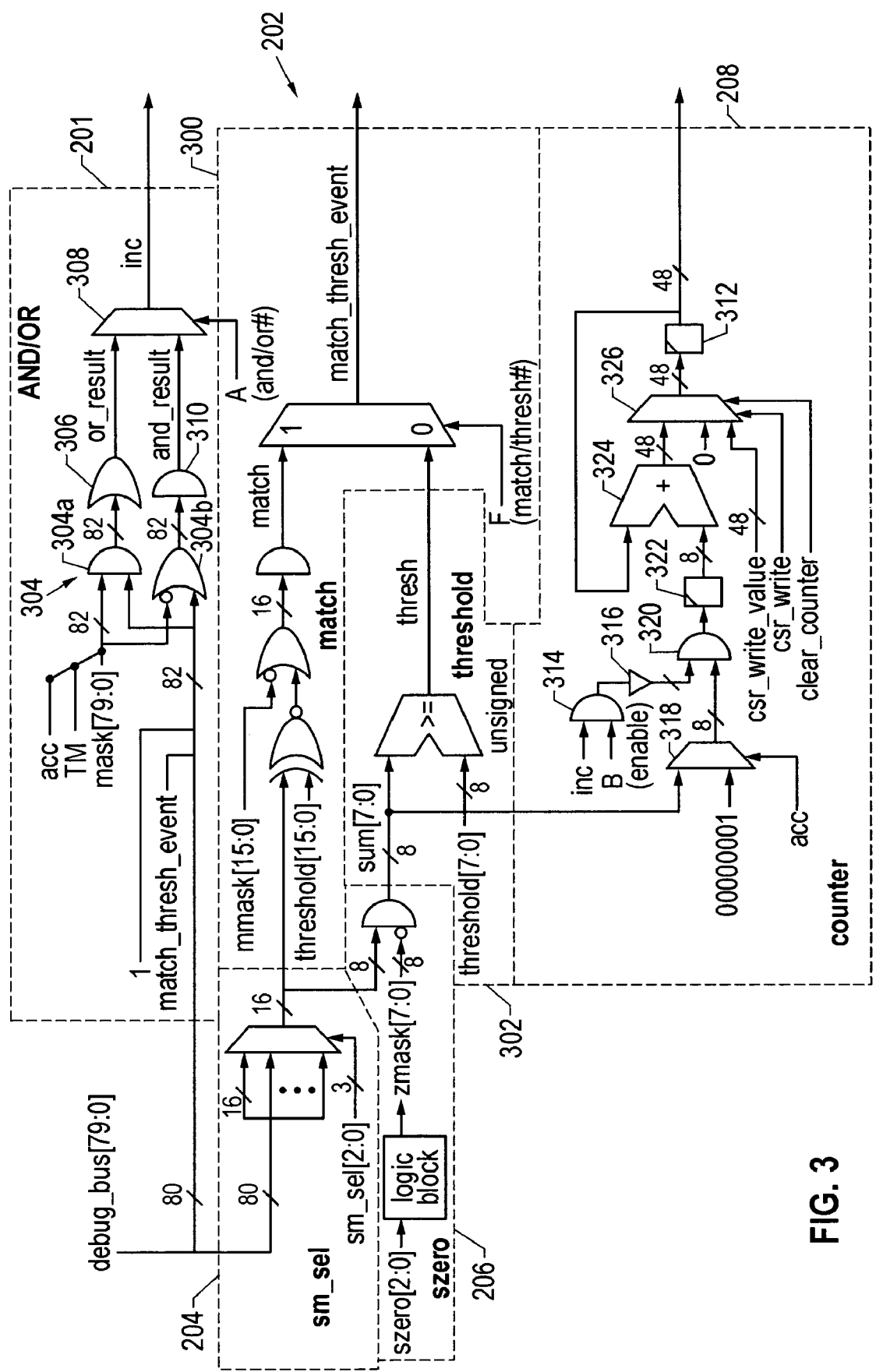
FIG. 3 is a more detailed block diagram of the general purpose performance counter of FIG. 2.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold for all bits selected by a match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh_event signal is one of the two bits appended to the debug_bus signal. In the illustrated embodiment, N is equal to 16.

When the match/threshold circuit 202 is operating in "threshold" mode, a threshold portion 302 (FIG. 3) of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

Additional details regarding operation of the match/threshold circuit 202 are provided in U.S. patent application Ser. No. 10/635,373, filed Aug. 6, 2003, entitled MATCH CIRCUIT FOR PERFORMANCE COUNTER now U.S. Pat. No. 7,331,003.

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. The szero circuit 206 zeroes out none or all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the szero circuit 206 are provided in U.S. patent application Ser. No. 10/635,103, filed Aug. 6, 2003, entitled DATA SELECTION CIRCUIT FOR PERFORMANCE COUNTER now U.S. Pat. No. 7,404,112, and U.S. patent application Ser. No. 10/635,079, filed Aug. 6, 2003, entitled ZEROING CIRCUIT FOR PERFORMANCE COUNTER now U.S. Pat . No. 7,430,696.

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
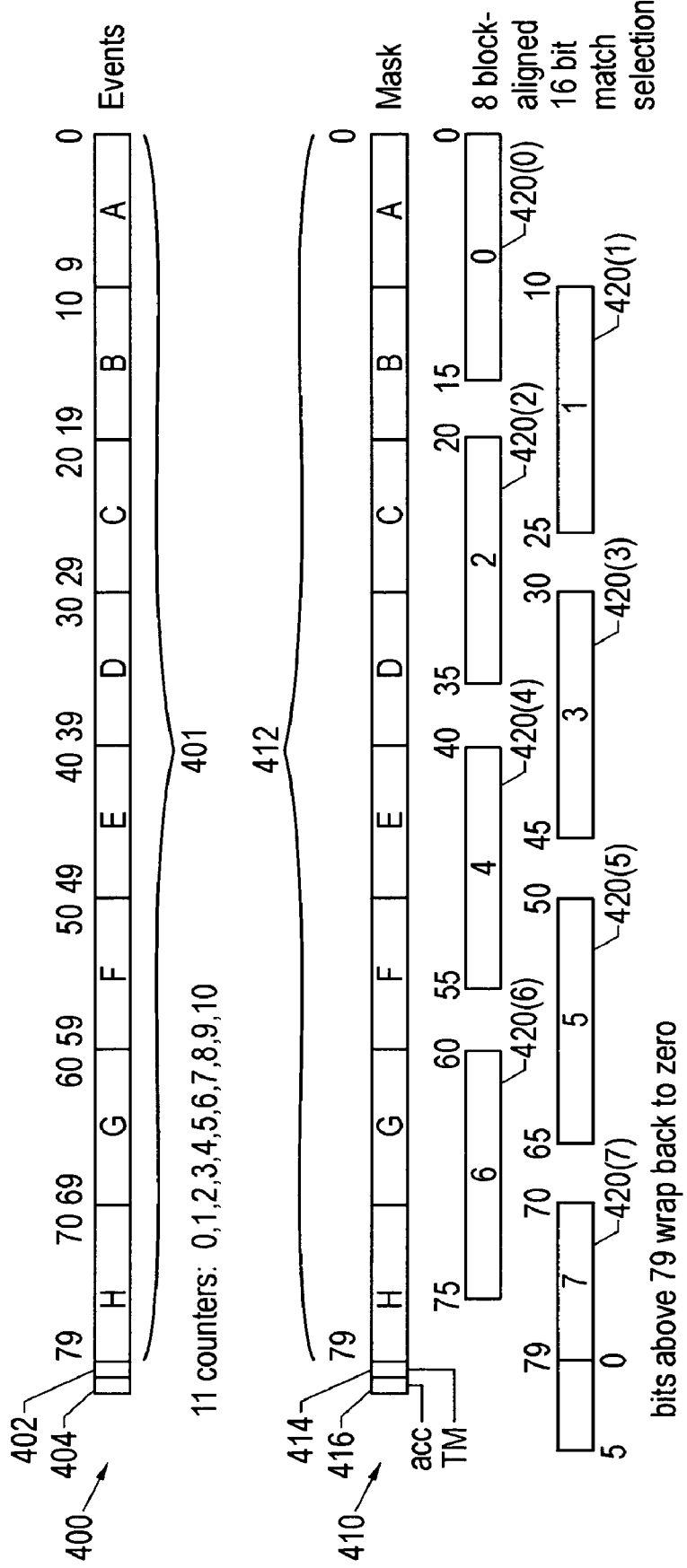
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") from a control status register (CSR) (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting a counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8× replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters, each being represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

Figure 5:
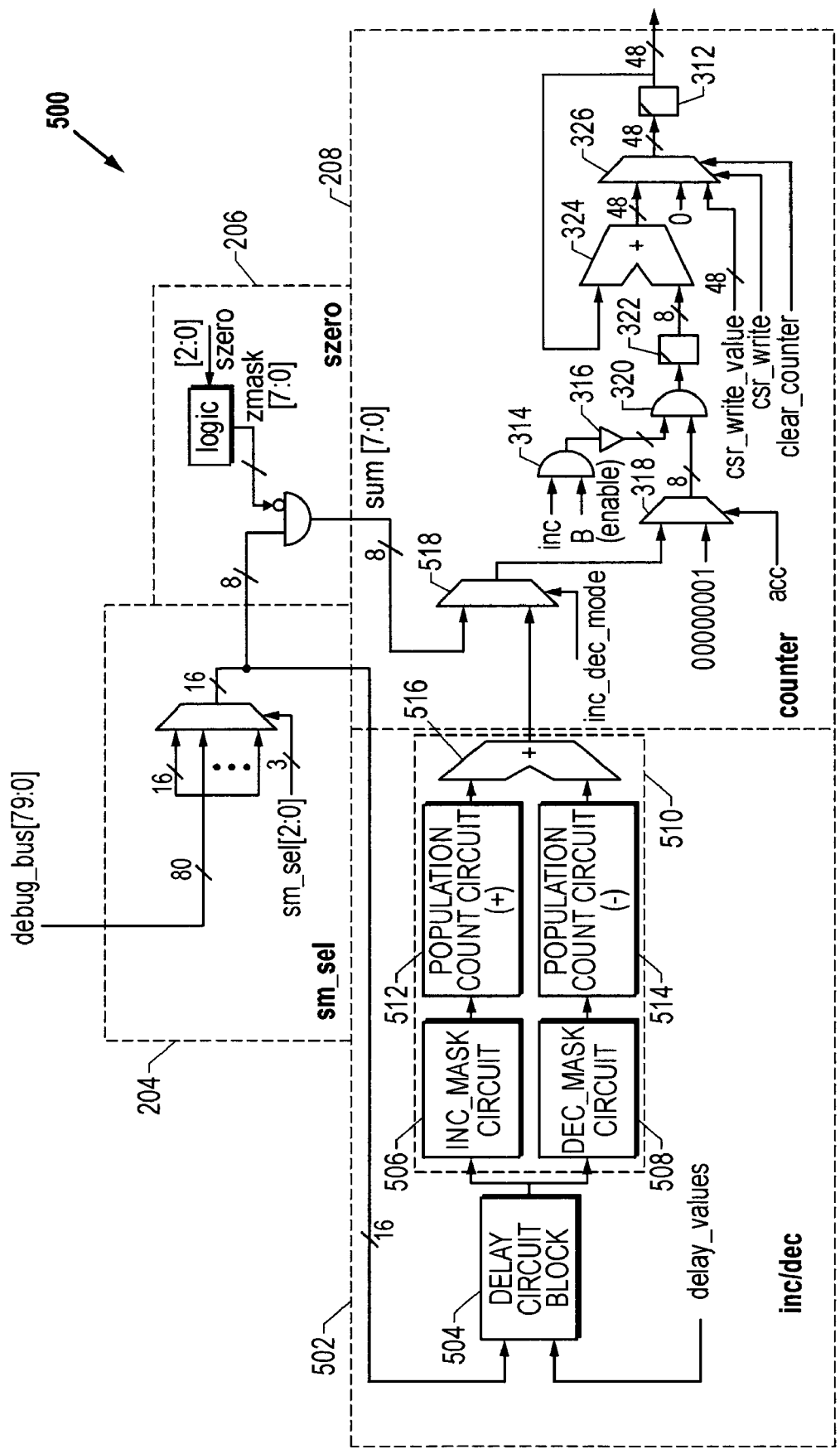
FIG. 5 depicts a block diagram of a portion of the GPPC of FIG. 3 which employs an increment/decrement circuit according to one embodiment.

FIG. 5 depicts a circuit portion 500 which illustrates in further detail a section of the GPPC of FIG. 3 employed in conjunction with an increment/decrement circuit 502 according to one embodiment. In general, the increment/decrement circuit 502 provides incrementing and decrementing functionality to the GPPC. Complex logic designs often require that the logic states be brought out so that designers can examine the interior workings of the logic performance. In this regard, the increment/decrement circuit 502 provides the functionality to the GPPC to maintain a count of outstanding transactions that may be used relative to latency calculations as discussed hereinbelow. Alternatively, the increment/decrement circuit 502 provides state machine functionality to the GPPC so that the GPPC may be employed for advanced triggering, debugging, coverage analysis, and performance analysis, for example.

As illustrated and previously alluded to, the debug_bus[79:0] is driven to the sm_sel circuit 204 which selects N bits (N=16 in FIG. 5) and forwards the 16 bits to the increment/decrement circuit 502 via a 16-bit wide signal selected by the sm_sel circuit. A delay circuit block 504 receives the selected signal which comprises debug data and delays the debug data in order to appropriately align the debug data. A delay_values signal provides user-configurable information to the delay circuit block 504 for delaying and aligning the debug data by a select number of clock periods. The aligned debug signals are forwarded to an increment mask ("inc_mask") circuit 506 and a decrement mask ("dec_mask") circuit 508 that are positioned in parallel for selecting the signals used to increment or decrement the counter circuitry of the GPPC. The increment mask circuit 506 and the decrement mask circuit 508 each selectively forwards portions of the aligned debug data to an accumulation circuit 510. In particular, the increment mask circuit 506 and the decrement mask circuit 508 select the portions of the aligned debug signals that will increment and decrement the counter, respectively, depending on the specific masks employed by the increment mask circuit 506 and decrement mask circuit 508.

The accumulation circuit 510 includes a positive population count circuit 512 coupled to the increment mask circuit 506 and a negative population count circuit 514 coupled to the decrement mask circuit 508. The positive population count circuit 512 and the negative population count circuit 514 output the number of respective active inputs to an adder circuit 516. It should be appreciated, however, that although an adder circuit is illustrated, the accumulation circuit may employ a subtract circuit. The values of the outputs of the population count circuits are accumulated by the adder circuit 516 and forwarded to the counter circuit 208. As illustrated, within the counter circuit 208, a MUX block 518 under the control of an inc_dec_mode signal is operable to select the signal from the adder circuit 516 of the increment/decrement circuit 502 for further processing. Specifically, the inc_dec_mode signal controls the MUX block 518 to select between the 8-bit sum [7:0] signal from the szero circuit 206 or the signal provided by the increment/decrement circuit 502. In instances where the MUX block 518 selects the signal from the increment/decrement circuit 502, the signal is forwarded to the counter circuit for further processing relative to operations including latency calculations, advanced triggering, debug calculations, coverage calculations, and performance analysis, for example.

Figure 6A:
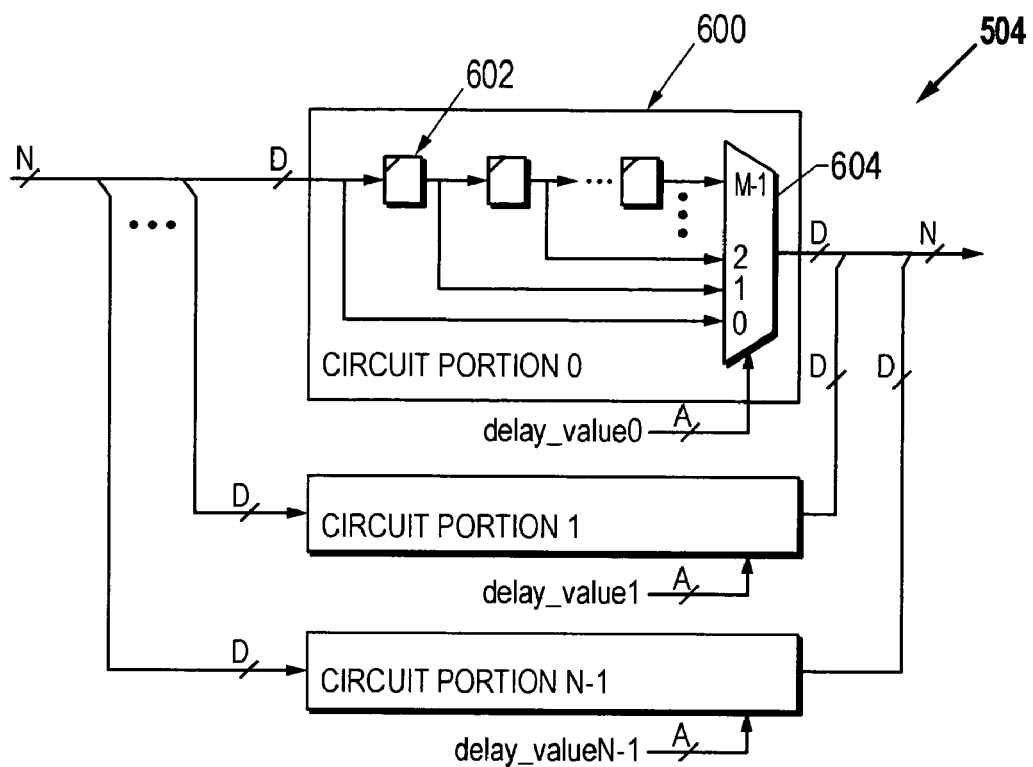
FIG. 6A depicts a block diagram of one embodiment of the delay circuit block illustrated in FIG. 5.

FIG. 6A depicts one embodiment of the delay circuit block 504 illustrated in FIG. 5. An N-bit wide debug data signal comprising any D bits of the debug_bus is routed to at least one circuit portion 600 such that portions of the signal may be appropriately delayed and aligned. As illustrated, the at least one circuit portion 600 includes circuit portions 0 through (N−1). Specifically, within the circuit portion 0, a series of registers 602 provide a plurality of taps that serve as inputs to a MUX block 604. A delay_value0 signal provides control to the MUX block 604 in order to provide the appropriate signal selection and, in turn, delay and alignment. Although not depicted in detail, it should be appreciated that the second through (N−1)th circuit portions of the delay circuit 504 have a similar structure to the first circuit portion, i.e., circuit portion 0. Accordingly, each bit of a selected D-bit segment of the N-bit debug bus can be delayed independently by 0 to M−1 clock cycles (delay_value width, $A=\log_2[M]$) such that the increments and decrements align properly with the appropriate events. After the N-bit wide debug data signal is aligned and delayed, an N-bit outgoing aligned debug signal comprising the aforementioned blocks of D bits of the debug_bus is forwarded, whereby each D-bit segment is provided to the corresponding increment mask circuit 506 and the decrement mask circuit 508 as discussed relative to FIG. 5. It should be apparent that in the illustrated embodiment of FIG. 6A, each D-bit segment comprises a 1-bit segment since N circuit portions are used with respect to the N bits of debug data signal.

Figures 6B, 6C:
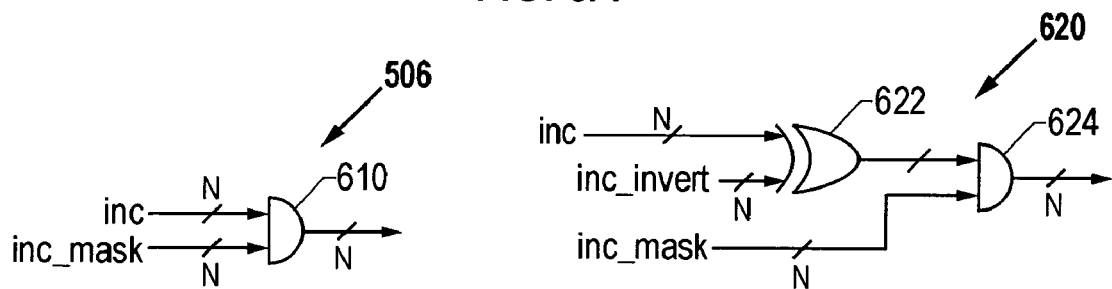
FIG. 6B depicts a block diagram of one embodiment of a inc_mask circuit block illustrated in FIG. 5.
FIG. 6C depicts a block diagram of another embodiment of the inc_mask circuit block illustrated in FIG. 5.

FIG. 6B depicts one embodiment of an inc_mask circuit, a portion of which may be used as the inc_mask block 506 illustrated in FIG. 5. The aligned debug signal, i.e., inc signal, and an inc_mask signal are supplied as inputs to an AND block 610 (including N 2-input AND gates) which provides N outputs depending on the masking instructions provided by the N-bit inc_mask signal. The illustrated AND circuit may be employed in instances wherein the input debug signals are always active high.

FIG. 6C depicts another embodiment of the inc_mask circuit operable with respect to an N-bit wide debug bus. As illustrated, an inverted inc_mask circuit 620 comprises N XOR gates 622 and N AND gates 624. More specifically, the aligned debug signal, i.e., the inc signal, and an N-bit wide inc_invert signal are bit-wise XOR'ed for supplying an N-bit wide output to the N AND gates 624. The second input to the AND gates 624 is the N-bit wide inc_mask signal. Based on the output of the XOR gates 622 and the N-bit wide inc_mask signal, the AND gates 624 provide an N-bit output signal. The illustrated inverted inc_mask circuit 620 may be employed in instances where the input debug signals are not always active high. Those skilled in the art should recognize that similar to the various embodiments of the inc_mask circuit set forth hereinabove, a variety of implementations may be realized for the dec_mask circuit as well.

Figure 6D:
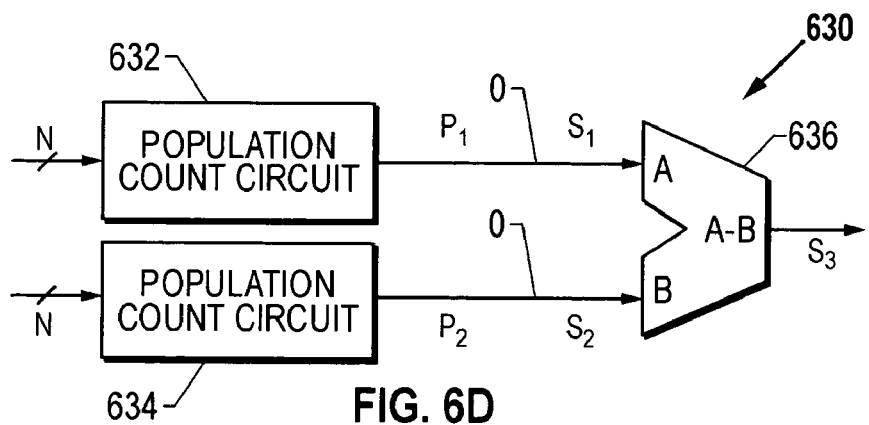
FIG. 6D depicts a block diagram of one embodiment of the accumulation circuit illustrated in FIG. 5.

FIG. 6D depicts another embodiment of a portion of accumulation circuit 510 illustrated in FIG. 5. In the illustrated embodiment of a subtract accumulation circuit 630, the same population count circuit implementation may be used for both increments and decrements. A first population count circuit 632 receives the N-bit wide masked debug data signal from the inc_mask circuit 506. Responsive thereto, the first population count circuit is operable to output a population value, $P_1$, which is based on the number of active inputs. This value is subsequently padded with the necessary number of zeros to provide a D-bit sum value, $S_1$ where D can be 8, 16, etc. Similarly, a second population count circuit 634 receives the N-bit wide masked debug data signal from the dec_mask circuit 508. Responsive thereto, the second population count circuit 634 is operable to output a population value, $P_2$, which is also padded with the necessary number of zeros to provide another D-bit sum value, $S_2$. The two D-bit sum values are subtracted from one another to provide a D-bit output value, $S_3$, which may be forwarded to the counter circuit of FIG. 5 for further processing.

Figure 7:
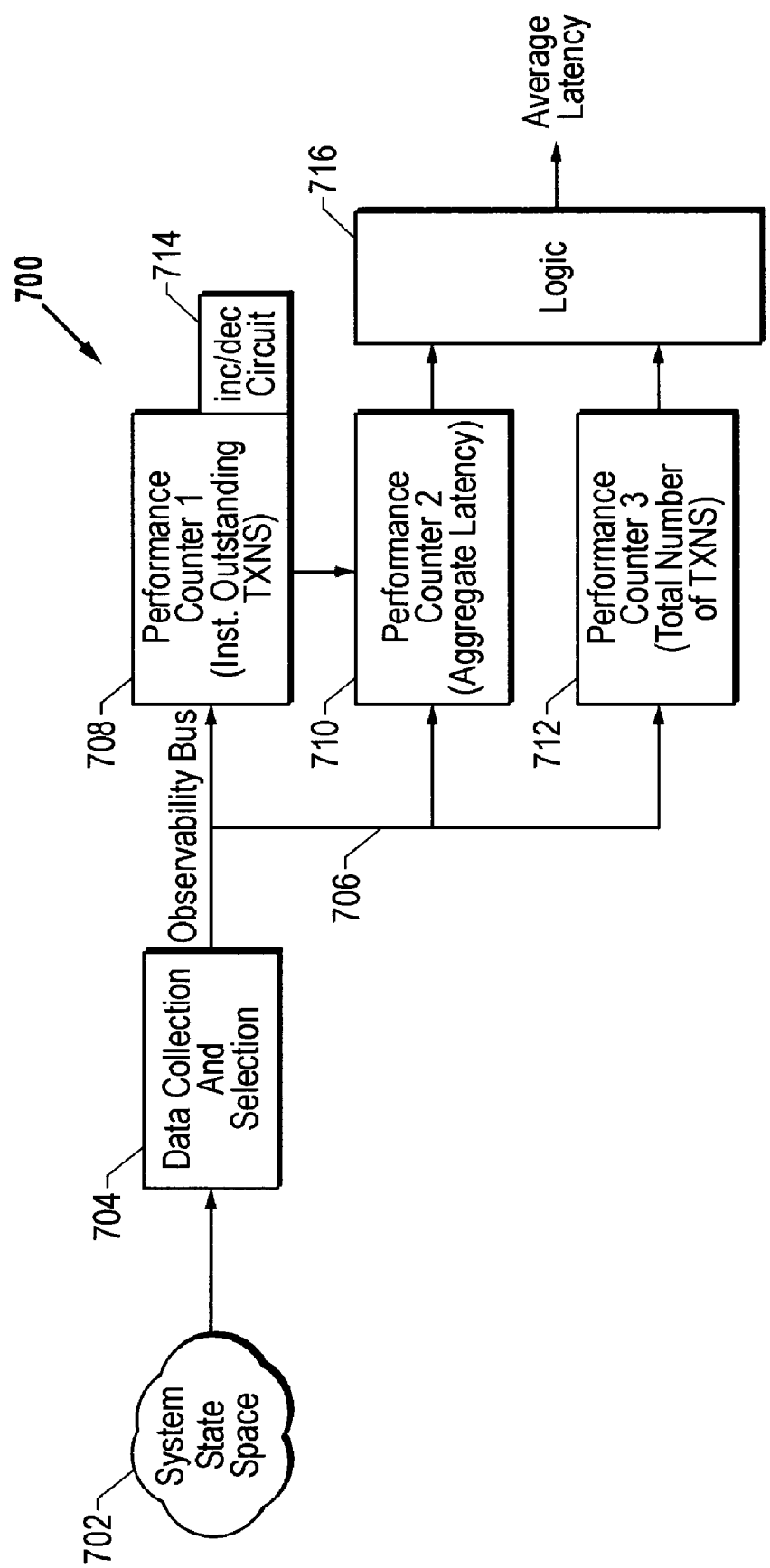
FIG. 7 depicts a block diagram of a system for determining latency for use with a bus carrying debug data.

FIG. 7 depicts a system 700 for determining latency in a logic design, for example, the average latency of a memory read transaction from a processor bus. Similar to the illustration presented in FIG. 1, a state space 702 including the processor bus is driven to data collection and selection logic 704 which, in turn, drives a D-bit data collection, or observability bus 706 carrying a D-bit debug_bus signal to three performance counters, i.e., performance counter 708, performance counter 710, and performance counter 712. The performance counter 708 includes an increment/decrement circuit 714 in order to determine the number of instantaneous outstanding transactions on the processor bus as collected in the D-bit debug bus signal. The performance counter 708 and increment/decrement circuit 714 function in a similar manner to the circuit portion 500 described in FIG. 5 hereinabove. Accordingly, based on the data captured on the observability bus 706, the performance counter determines a number of instantaneous outstanding transactions present on the logic design's processor bus.

The performance counter 710 has similar functionality to the GPPC presented and described in association with FIG. 3. Based on the number of instantaneous outstanding transactions, the performance counter 710 determines the aggregate latency using its counter circuitry in accumulation mode. More specifically, the performance counter 710 uses the storing and aggregation functionality of the GPPC to maintain a running total of the instantaneous outstanding transactions.

The performance counter 712 also has a functionality similar to that of the GPPC presented and described in association with FIG. 3. The performance counter 712 is positioned in communication with the observability bus 706 in order to monitor the total number of transactions. A logic component 716 (which could be a software or a hardware component) is coupled to the performance counter 710 and the performance counter 712 in order to determine the average latency, which is the aggregate latency divided by the total number of transactions.

Referring now to FIGS. 5 and 7, by way of example, the system 700 will now be described in further detail relative to calculating the average latency of a memory read from a processor bus. To determine the average latency of a memory read from a processor bus, the following three signals are selected from the random logic for monitoring: a bus_read signal which represents when the processor read first appears on the bus; a data_return signal which represents when the data from memory is returned to the processor on the bus; and a cache_return signal which represents when one processor on the bus supplies the data instead of memory. Each of these three signals is selected onto the data collection bus, i.e., debug_bus, and selected via the sm_sel circuit 204 into the increment/decrement circuit 502. The delay circuit block 504 aligns each of the three signals, such that, for example, each is active three cycles after the read, data or cache_return appears on the bus. It should be appreciated that, in the present example, any misalignment between bus_read signal and the data (or, between the bus_read and cache_return signals) may be compensated by appropriately adding or subtracting from the average latency.

The increment mask circuit 506 matches the bus_read signal such that the increment population count will be 0 or 1. The decrement mask matches the data_return and cache_return signals such that the decrement population count will be 0, −1, or −2. The two population count circuits 512 and 514 are summed by the adder circuit 516 and the forwarded to the counter circuit 208 of the GPPC. Thus the performance counter's value is the number of instantaneous outstanding transactions (i.e., transactions that don't have matching data or cache returns). As previously discussed, based on the number of instantaneous outstanding transactions, the performance counter 710 determines the aggregate latency by maintaining a running total of the outputs of counter 208 of the performance counter 708. Additionally, as discussed, the performance counter 712 is in communication with the observability bus 706 in order to monitor the number of transactions. The logic component 716 calculates the average latency by dividing the aggregate latency supplied by the performance counter 710 by the number of transactions supplied by the performance counter 712. It should be appreciated that in addition to determining average latency, the system described herein may be employed in association with advanced triggering, debug calculations, coverage calculations, and performance analysis, for example.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. An increment/decrement circuit for use with a general purpose performance counter ("GPPC") connected to a bus carrying debug data, the increment/decrement circuit comprising:
a delay circuit block operable to receive and align a multi-bit block of said debug data;
a first mask circuit connected to said delay circuit block, wherein said first mask circuit is operable to select a first portion of said aligned, multi-bit block of debug data;
a second mask circuit connected to said delay circuit block, wherein said second mask circuit is operable to select a second portion of said aligned, multi-bit block of debug data; and
an accumulation circuit connected to said first mask circuit and said second mask circuit, said accumulation circuit for generating an accumulated value using said first portion and said second portion.

2. The increment/decrement circuit as recited in claim 1, wherein said multi-bit block of said debug data comprises 16 bits.

3. The increment/decrement circuit as recited in claim 1, wherein said multi-bit block of said debug data forms a portion of an 80-bit wide debug data signal.

4. The increment/decrement circuit as recited in claim 1, wherein said delay circuit block is operable responsive to a delay_values signal that provides clock delaying values for each bit in said multi-bit block of said debug data.

5. The increment/decrement circuit as recited in claim 1, wherein said delay circuit block includes a series of registers operable to be tapped for providing a plurality of inputs to a Multiplexer (MUX) block that is controlled by a delay_values signal.

6. The increment/decrement circuit as recited in claim 1, wherein said first mask circuit comprises an AND block having a plurality of 2-input AND gates for bit-wise ANDing said aligned, multi-bit block of said debug data with a multi-bit inc_mask signal.

7. The increment/decrement circuit as recited in claim 1, wherein said first mask circuit comprises:
an XOR block having a plurality of XOR gates for bit-wise XORing said aligned, multi-bit block of said debug data with a multi-bit inc_invert signal to generate a multi-bit output signal; and
an AND block having a plurality of 2-input AND gates for bit-wise ANDing said multi-bit output signal with a multi-bit inc_mask signal.

8. The increment/decrement circuit as recited in claim 1, wherein said accumulation circuit comprises:
a first population count circuit coupled to said first mask circuit;
a second population count circuit coupled to said second mask circuit; and
an adder circuit coupled to said first population count circuit and said second population count circuit.

9. The increment/decrement circuit as recited in claim 1, wherein said accumulation circuit comprises:
a first population count circuit coupled to said first mask circuit;
a second population count circuit coupled to said second mask circuit; and
a subtract circuit coupled to said first population count circuit and said second population count circuit.

10. The increment/decrement circuit as recited in claim 1, wherein said accumulation circuit is operable to forward a signal indicative of an instantaneous outstanding transaction count based on outputs provided by said first and second mask circuits.

11. The increment/decrement circuit as recited in claim 10, wherein said instantaneous outstanding transaction count is forwarded to a counter circuit for further processing.

12. A computer system having an increment/decrement circuit for use with a general purpose performance counter ("GPPC") connected to a bus carrying debug data, the increment/decrement circuit comprising:
- means for receiving and aligning a multi-bit block of said debug data;
- means for selecting a first portion of said block of aligned debug data;
- means for selecting a second portion of said block of aligned debug data; and
- means for generating an accumulated value using said first portion and said second portion.

13. The computer system as recited in claim 12, wherein said means for generating an accumulated value is operable to forward a signal indicative of an instantaneous outstanding transaction count based on said first portion and said second portion.

14. The computer system as recited in claim 13, wherein said instantaneous outstanding transaction count is forwarded to a counter circuit for further processing relative to operations selected from the group consisting of latency calculations, advanced triggering, debug calculations, coverage calculations, and performance analysis.

* * * * *